United States Patent Office 2,787,538
Patented Apr. 2, 1957

2,787,538

PRODUCTION OF URANIUM

Frank H. Spedding, Harley A. Wilhelm, and Wayne H. Keller, Ames, Iowa, assignors to the United States of America as represented by the United States Atomic Energy Commission No Drawing. Application February 23, 1944,
Serial No. 523,556

1 Claim. (Cl. 75—84.1)

The invention relates to the production of uranium, and more particularly to the production of uranium in the form of massive metal.

As massive uranium metal is of considerable value in the field of metallurgy, it is desirable to provide a method by which uranium in the form of massive metal can be conveniently and inexpensively produced in a relatively pure state and in a form that permits convenient metallurgical treatment without substantial formation of uranium oxide. It is an object of the invention to provide such a method. Other objects and advantages will be apparent from the following description.

It has been found that of the uranium compounds that may be used to produce massive uranium metal the uranium halides are most suitable for this purpose. Massive uranium metal may be produced from uranium halides by reacting the latter with magnesium, which is relatively inexpensive, is easily handled, and does not alloy with the massive uranium metal formed during the reaction. Magnesium is easily pulverized to a properly small particle size.

Where magnesium is reacted with a uranium halide, and particularly uranium tetrafluoride, there is insufficient heat developed during the reaction to produce the desired massive uranium metal. Additional heat must be added to maintain the uranium in a molten state as it is formed during the reaction and thereby permit the molten uranium to withdraw from the other substances present by gravity separation and to form into an ingot of massive metal.

While such additional heat may be supplied by preheating the reaction mixture, it has been found to be advantageous to obtain at least a portion of the additional heat by a reaction auxiliary to the main reaction of the uranium halide and magnesium, and which takes place substantially simultaneously therewith. The auxiliary reaction may be advantageously obtained by reacting an oxidant such as potassium chlorate with magnesium. The heat developed by the auxiliary reaction in addition to that of the main reaction is sufficient to produce the massive uranium metal. If desired, the additional heat may be supplied in part by an auxiliary reaction and in part by preheating the reaction mixture.

In carrying out the invention, the reaction is preferably carried out with substantially anhydrous materials. Substantially anhydrous uranium tetrafluoride in a finely divided form is mixed with an excess of the theoretical amount of granular magnesium necessary to displace the uranium and thereby form uranium metal and magnesium fluoride. The excess over the chemically equivalent quantity of granular magnesium required is somewhat dependent upon the particle size of the uranium tetrafluoride, that is, the finer the uranium tetrafluoride, the less excess of granular magnesium required.

It has been found that close control of the particle size of the reactants and particularly the particle size of the uranium tetrafluoride is important in obtaining massive uranium metal from the reaction and in securing relatively high yields. Where the particle size of the uranium tetrafluoride is such that 90 percent passes a 60 mesh screen, 85 percent passes an 80 mesh screen, 75 percent passes a 100 mesh screen, and 50 percent passes a 200 mesh screen, it has been found that the reaction takes place very satisfactorily and gives yields of massive metallic uranium ranging from 80 percent to 95 percent of the theoretical value. Preferably, the uranium tetrafluoride has a particle size in which over 75 percent is minus 60 mesh, over 60 percent is minus 80 mesh, over 50 percent is minus 100 mesh, and over 40 percent is minus 200 mesh.

The particle size of the magnesium is also important within limits. Where approximately 95 percent of the magnsium is minus 10 mesh and approximately 15 percent is minus 20 mesh, the reaction proceeds satisfactorily if the uranium tetrafluoride has the proper particle size. Preferably, the magnesium has a particle size not greater than 7 mesh. It is desirable to have a small amount of very fine magnesium present, as such fines aid in initiating the reaction. As the reaction proceeds, due to the heat of the reaction, the magnesium tends to vaporize and intimately mix with the uranium tetrafluoride.

The reactants are thoroughly mixed and placed in a suitable container, which is preferably an iron crucible having sufficient wall thickness to resist corrosion effects of the reaction and its products and to withstand pressures developed during the reaction. To lessen corrosion of the cotnainer or bomb and to prevent contamination of the desired product of the reaction, a refractory lining is placed around the interior surfaces of the bomb. Such refractory lining may be formed of any suitbale refractory material, such as calcined calcium oxide, magnesium oxide or the like.

If liner materials substantially free from certain impurities are chosen, this method is capable of producing uranium metal of exceptional purity with regard to these same impurities. For example, the liner material may be substantially free from such impurities as boron, cadmium, and rare earths. Thus, if the boron content of the lining material is less than twenty parts per million by weight, preferably less than ten parts per million, uranium metal containing 0.1 to 0.3 part per million of boron can be produced. Similar relationship hold for other impurities.

In preparing the container to receive the charge, an open-ended cylindrical form having a diameter sufficiently smaller than the interior diameter of the container to provide the proper wall thickness of the refractory lining is held in substantially coaxial position in the container and pulverized calcium oxide is tamped in between the form and the container. The charge is then poured into the center of the form and the form is withdrawn, leaving the charge in the center of the lined container. The wall thickness of the refractory lining is somewhat dependent upon the size of the crucible and charge; where a container having a six inch diameter is used, a lining of one-half inch thickness is formed with the thickness of the lining becoming increasingly greater as larger containers are used. A layer of refractory material may be placed over the charge before the cover is attached to the container.

The container is closed by means of a tightly fitting cap, which may be fastened to the container in any convenient manner, such as by bolts extending through flanges on the container and the cap.

To enable the reaction of uranium tetrafluoride and magnesium to produce massive uranium metal, a quantity of heat in addition to that developed during the reaction must be added to the reactants or reaction mixture before the reaction occurs or substantially simultaneously as the reaction occurs. The additional heat is necessary to maintain the uranium in a molten fluid condition for a period of time sufficient to permit a gravity separation of the uranium from the other less dense substances present and form an ingot of massive metal. The amount of heat that must be present during the reaction is approximately that developed during a reaction of uranium tetrafluoride and calcium, as described in our co-pending application entitled "Process for Production of Uranium," Serial No. 514,210, filed December 14, 1943. The amount of heat developed during the reaction of uranium tetrafluoride and magnesium supplies a portion of the necessary heat, thereby making the amount of heat to be added approximately the difference between the number of heat units developed during the reaction of uranium tetrafluoride and calcium and the number of heat units developed during the reaction of uranium tetrafluoride and magnesium, as described in our co-pending application.

The amount of heat to be added either as actual heat resulting from preheating or the like or as potential heat in the form of an auxiliary exothermic reaction is somewhat dependent upon the conditions under which the process is carried out. For example, heat loss by radiation from the crucible must be compensated for by the quantity of heat added. The heat loss may be decreased by efficiently insulating the crucible or by proportionately increasing the amount of charge, the size of the crucible, and the like. Generally, the amount of heat supplied by the auxiliary reaction should be increased as the size of the charge and crucible is decreased.

All or a portion of the additional heat may be supplied by an auxiliary reaction that will develop sufficient heat to cause the main reaction to produce massive uranium metal. The auxiliary reaction may be obtained by reacting an oxidant, such as potassium chlorate, $KClO_3$, potassium persulphate, $K_2S_2O_8$, iodine, $I_2$, or the like, with a quantity of magnesium in addition to that used for the main reaction. The auxiliary reaction mixture may be distributed throughout the main reaction mixture before the latter is placed in the container.

Where potassium chlorate is used, it has been found that the quantity of oxidant necessary to provide sufficient additional heat is in the ratio of 1 mol of potassium chlorate for each 7 mols of uranium halide where from 400 to 4000 grams of uranium halide are used. While the amount of oxidant in proportion to the quantity of uranium halide may be varied within limits, it is preferred that at least 1 mol of potassium chlorate be used for each 10 mols of uranium halide. Where $K_2S_2O_8$ is used, the amount of oxidant used may suitably be approximately 1 mol of $K_2S_2O_8$ for each 14 mols of the uranium halide where approximately 6000 grams of uranium halide are used. An excess of magnesium is used both for the reaction with uranium halide and with the oxidant, the excess preferably being between 10 and 20 percent for each reactant. The auxiliary reaction occurs during the main reaction of the uranium halide and magnesium and develops sufficient heat in addition to that of the main reaction to produce the massive uranium metal.

If desired, a portion of the additional heat may be supplied by the auxiliary reaction and the remainder of the additional heat supplied by preheating the reaction mixture. The use of the auxiliary reaction to supply a portion of the heat lowers the time and temperatures required for the preheating. The amount of the heat added by the auxiliary reaction to that added by the preheating may be in any proportion with the limits of such proportion being governed primarily by the practical aspects of the process.

When the additional heat is supplied only by the auxiliary reaction or when the heat supplied by preheating has been introduced into the reaction mixture, the reaction may be initiated by raising the temperature of some portion of the reaction mixture to the temperature of the reaction. This may be done internally by an electrically heated fuse wire extending into the reaction mixture, or externally as by heating in a furnace until the reaction temperature is reached.

Where very pure massive uranium metal is desired, the fuse wire may comprise uranium wire, ribbon, or the like, which is electrically heated to initiate the reaction.

During the reaction, the outside temperature of the container rises very quickly and in a few minutes begins to drop, indicating that the reaction has been for the most part completed. The container is then permitted to cool to room temperature, after which it is opened and the ingot of massive uranium metal is removed. During the reaction, the uranium is displaced by magnesium and, under the high heat of the reaction, the uranium metal collects in the bottom of the container as a solid ingot of massive uranium metal. Because of the greater density of the uranium metal, the magnesium fluoride and other impurities are concentrated on top of the ingot.

When the reaction is carried out under the conditions herein described, the yield of massive uranium metal is close to the theoretical yield. Generally, the yields have ranged from 85 percent to 95 percent of the theoretical yield. Most of the massive uranium metal of the ingot is in a form that permits it to be readily recast or otherwise handled in accordance with conventional metallurgical practice.

In one example of the process in which all of the additional heat was supplied by the auxiliary reaction, 440 grams of uranium tetrafluoride of the preferred order of particle size as above described were intimately mixed with 109 grams of magnesium and 24.5 grams of potassium chlorate, the charge packed in an iron crucible lined with calcined calcium oxide, a layer of calcium oxide placed over the charge, and the crucible cap securely attached. The reaction was initiated internally by means of a fuse wire of uranium extending into the reaction mixture and electrically heated to above the reaction temperature. An ingot of massive uranium metal in the amount of 300.2 grams was obtained representing a yield of approximately 90 percent of the theoretical yield.

In a second example, 3030 grams of uranium tetrafluoride, 763 grams of magnesium, and 172 grams of potassium chlorate were mixed and packed in a crucible lined with calcined calcium oxide. The charge was ignited by an electrically heated fuse wire of uranium. In this instance, an ingot of massive uranium metal was obtained that weighed 1877 grams, representing a yield of approximately 80 percent of the theoretical yield.

In a third example of the process, all of the additional heat was supplied by the auxiliary reaction of potassium persulphate and magnesium. Uranium tetrafluoride in the amount of 12.4 pounds was intimately mixed with 2.94 pounds of magnesium and 0.65 pound of potassium persulphate. The charge was packed in a crucible lined with calcined calcium oxide and was ignited by an electrically heated fuse wire of uranium extending into the charge. An ingot of metal weighing 9.25 pounds was obtained, representing a yield of approximately 98 percent of the theoretical yield.

In another example of the process, a portion of the additional heat necessary was supplied by the auxiliary reaction and the remainder of the heat supplied by preheating the reaction mixture. Uranium tetrafluoride in the amount of 440 grams was mixed with 97 grams of magnesium and 12 grams of potassium chlorate and the charge placed in an iron crucible having a lining of calcined calcium oxide. A layer of calcium oxide was placed over the charge and the crucible cap securely attached. The charged crucible was heated in a gas-fired oven at 350° C. for one-half hour, the reaction then being initiated internally by the electrically heated fuse wire or uranium. An ingot of massive uranium metal in the amount of 316.8 grams was obtained, representing a yield of approximately 95 percent of the theoretical yield.

The massive uranium metal produced by the reaction of uranium tetrafluoride and magnesium under the herein-described conditions may be separated from the magnesium fluoride and other impurities associated with the ingot by raising the temperature of the ingot to a point where the pure massive uranium metal is molten and at which the magnesium fluoride and other impurities, such as uranium oxide and the like, are in a solid state and then permitting the molten uranium metal to flow away from the impurities.

While the reduction of a uranium halide has been specifically described as being obtained with magnesium, it is to be understood that alkali metals, such as sodium and potassium, or alkaline earth metals, such as calcium, barium, and strontium may be used for this purpose. If the process using calcium as the reducing metal is carried out on the scale indicated by the above-described examples, it is not necessary to introduce additional heat into the crucible; where the same process is carried out on a smaller scale, however, it is preferred that the charge be preheated or that an oxidant be added to the charge to supply the additional heat by an auxiliary reaction.

The above detailed description is given for purposes of illustration and the invention is to be limited only by the scope of the appended claim.

A related process for the production of massive uranium by reacting uranium tetrafluoride and magnesium is disclosed and claimed in our copending application, Serial No. 784,766, filed November 7, 1947.

What is claimed is:

A process for the production of massive uranium, which comprises preparing a mixture consisting of uranium tetrafluoride, magnesium, and iodine, wherein said magnesium is used in an amount greater than the stoichiometric amount for reaction with said uranium tetrafluoride and iodine, heating said mixture until a reaction is initiated whereby uranium forms and separates as a lower liquid phase and a slag phase forms, said slag phase containing magnesium fluoride and magnesium iodide, and separating said uranium and slag phases.

References Cited in the file of this patent

UNITED STATES PATENTS

| | | |
|---|---|---|
| 878,210 | Kuhne | Feb. 4, 1908 |
| 1,088,909 | Kuzel | May 3, 1914 |
| 1,373,038 | Weber | Mar. 29, 1921 |
| 1,415,516 | Bridge | May 9, 1922 |
| 1,568,685 | Moore | Jan. 5, 1926 |
| 1,593,660 | Lubowsky | July 27, 1926 |
| 1,648,954 | Marden | Nov. 15, 1927 |
| 1,659,209 | Marden | Feb. 14, 1928 |

FOREIGN PATENTS

| | | |
|---|---|---|
| 230,865 | Great Britain | Dec. 10, 1925 |

OTHER REFERENCES

Inorganic and Theoretical Chem., by Mellor, vol. 4, p. 316 (1923).

Ind. Eng. Chem. 18, pp. 114–116 (1926).

Mellor: Modern Inorganic Chemistry (1939) p. 527, pub. by Longmans Green & Co.